Aug. 31, 1948.  S. SCHNELL  2,448,194
COMPOUNDING MASTER CYLINDER
Filed Jan. 4, 1945
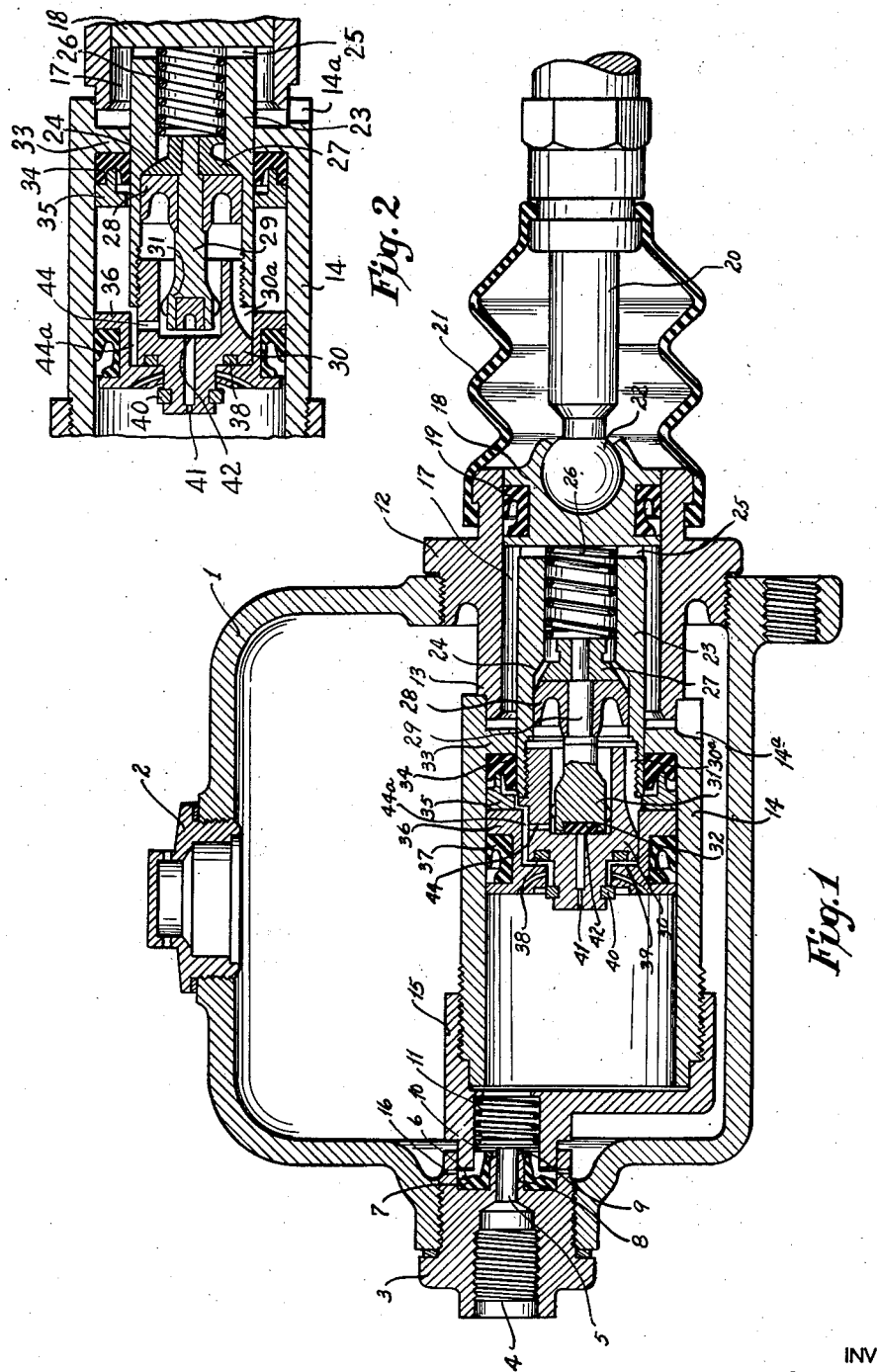
INVENTOR.
STEVE SCHNELL
BY
ATTORNEY.

Patented Aug. 31, 1948

2,448,194

UNITED STATES PATENT OFFICE 2,448,194

COMPOUNDING MASTER CYLINDER

Steve Schnell, Kirkwood, Mo., assignor to Wagner Electric Corporation, St. Louis, Mo., a corporation of Delaware Application January 4, 1945, Serial No. 571,274

9 Claims. (Cl. 60—54.6)

This invention relates to compensators or master cylinders employed in hydraulic brake systems and in its more specific aspects is directed to a more efficient method of compounding pressures in such devices.

The object of this invention is to produce a compensator that is capable of effecting a gradual transition of pressures from the low pressure piston to the high pressure piston.

Another object of this invention is to provide an improved compensator or compound master cylinder in which the high pressure producing means is unable to function until the brake shoes have been forced into engagement with the brake drum by the low pressure producing means irrespective of the rate of speed or the amount of force employed at which the brake pedal is depressed or released.

Another object of the invention is to provide a compound master cylinder in which the transition from the low pressure producing means to the high pressure producing means is effected without shock to the brake system regardless of the manner in which the compensator is actuated by the brake pedal.

Still another object of the invention is to provide a compound master cylinder in which the change-over from low pressure to high pressure is delayed rather than accelerated when the brake pedal is applied with undue vigor or speed.

A still further object of the invention is to provide a compounding type master cylinder in which sudden or violent increases in pedal pressure after the brake cylinder has changed into the low ratio will be cushioned by momentary change-back into the high pressure ratio.

Still another object of the invention is to produce a compound master cylinder or compensator which will perform the correct cycle of operation from low to high pressure change-over each time the brake pedal is depressed or released irrespective of the rapidity with which the action is repeated.

Other and further objects of the invention will occur to those skilled in the art to which this application pertains as the description proceeds, which, taken in connection with the accompanying drawings, sets forth a preferred embodiment of the invention but such disclosure is not to be construed as a limitation of the invention which is limited only by the appended claims and any and all modifications, alterations and variations of structure coming within the spirit and scope thereof are deemed to be included herein.

In prior constructions of master cylinders and compensators and, in fact, in any compounding system previously developed the principal objections thereto have been, as indicated above, a too sudden or violent change from the low pressure producing mechanism to the high pressure producing mechanism. Various and sundry types of cushioning expedients have been considered but none has thus far been produced to effect a gradual change-over such as is necessary to produce a smooth even flow of braking power whereby damage and unnecessary wear are obviated in the several parts of the system.

In the drawings Figure 1 is a vertical sectional view of a master cylinder incorporating the invention; and Figure 2 is a view of a portion of Figure 1 showing the position of the parts when in high pressure producing condition.

This invention constitutes an improvement over the disclosure in United States Patent No. 2,328,683, issued September 7, 1943.

The master cylinder comprises initially a casing 1 having a vented filler plug 2 therein and which is securable to an appropriate portion of the motor. At the forward end of casing 1, a plug 3 is threaded thereinto which is interiorly counterbored and tapped, as at 4, in order to receive the necessary conduit leading to the brake cylinders. The bore therein is of a reduced diameter at its inner end to form a small passageway 5 constituting a part of the entire counterbore 4. The plug 3 is constructed in a manner such that a portion thereof extends into the chamber formed in casing 1 and a bore 6 at the right-hand end thereof has a sealing cup which surrounds the inwardly extending member 8 of plug 3. Suitable means, such as a ring or collar 9, is pressed on member 8 and holds sealing cup or valve 7 in place. A spring 11 holds a washer 10 in engagement with collar 9.

Threaded into the opposite end of casing 1 is another bored plug 12 having a portion thereof extending into the casing provided with an exterior shoulder portion 13 at its left-hand end. Fitted onto the shoulder portion is one end of cylinder 14 and at its opposite end a cap 15 is threaded thereon which fits within bore 6 of plug 3 and is slidable relatively thereto. The cap 15 is bored to receive spring 11 previously described. The cap 15 is suitably interiorly collared in order to hold spring 11 in position. Spring 11 is relatively weak because it is not intended to resist the movement of cylinder 14. The cap 15 is machined to a reduced diameter at its left end to freely slide in bore 6 of plug 3. The inwardly extending portion of plug 3 is provided with a plurality of radial slots 16 in order to allow fluid contained in the chamber in housing 1 to pass therethrough past washer 10 and about the end of the reduced diameter portion of cap 15 and thence into cylinder 14. Washer 10 keeps the left end of cylinder 14 full and prevents a rapid reverse flow of the fluid into the chamber.

The plug 12 has a machined bore 17 therein in which is received a piston device 18 provided with a sealing cup 19 to prevent escape of fluid from the chamber in casing 1. A piston rod 20 actuated by a suitable brake pedal device (not shown) is intended to move piston 18 and its sealing cup 19 axially of bore 17 in plug 12. To prevent dust and other foreign matter entering bore 17 in plug 12, a flexible boot 21 is provided about piston rod 20. The piston rod 20 has a conventional ball and socket connection 22 with the piston to permit relative movement of the parts.

The piston 18 has a forwardly extended piston or valve holder 23 which is counterbored and has a valve seat 24 formed thereon. This portion constitutes the smaller piston subsequently discussed. At the rear end of the piston 23 there is a plurality of radial apertures 25 formed therein that connect the interior bore of the piston 23 with bore 17 and ultimately to the interior of the chamber in casing 1 through radial slots 14a in cylinder 14. A spring 26 is arranged in the counterbore in piston 23, one end of which engages piston 18 and the other end is engageable with the valve 27, which is engageable with seat 24 and slidable in the larger portion of the bore in piston 23. A sealing cup 28 is engaged by the valve 27 and the associated sealing cup 28 and valve 27 are mounted on a rod 29 as shown. The rod 29 extends forwardly in piston 23 and is received within the piston head 30 that is bored to receive a head 31 on rod 29 in which a valve 32 is arranged. The piston head 30 is threaded into the piston 23 and the entire structure is relatively slidable with respect to cylinder 14.

The cylinder 14 has an inwardly extending collar portion 33 and on the inner side of this collar snugly fitting the exterior of the piston 23 is a pressure sealing cup 34 engageable with a seat on the ring element 35 abutting piston 36. Ring 35 remains in engagement with sealing cup 34 at all times. Piston 36 is equipped with a sealing cup 37 arranged in an appropriate groove provided in the piston. The piston 36 completely surrounds the piston head 30 previously discussed. Piston head 30 has a valve 38 therein seating against face 39 formed on piston 36. Suitable retaining means 40 are provided on the piston head 30 to prevent a possible disassembly of the parts. A counterbored aperture 41 connects the interior of cylinder 14 with the interior of piston 30 and associated parts.

The operation of the device set forth in the attached drawings is as follows: When the brake pedal (not shown) is depressed, rod 20 will be advanced and move pistons 18 and 23. During the initial movement of pistons 18 and 23 to the left it will cause cylinder 14 to move to the left by reason of the friction between parts 34 and 23 to thereby close valve 7. Thereafter piston 23 will slide relatively to cylinder 14 and sealing cup 34 and piston 36 to close valve 38 by seating it against surface 39 on piston 36. Piston 23 carries its piston head 30 and moves relatively to piston 36 until valve 38 seats against the surface 39 of piston 36. This action seals fluid in the left-hand end of cylinder 14 and prevents its escape to the right of the large piston 36. Continued movement of the rod 20 to the left will now be transmitted to the large piston 36 by means of the engagement of valve 38 with seat 39, which displaces fluid from cylinder 14 causing it to be exhausted through the duct or bore 4 to expand the brake shoes against the brake drums in the customary manner. Simultaneously fluid in cylinder 14 will exert pressure against valve 32 over an area determined by the diameter of valve seat 42 which is the diameter of passageway 41 at the point where it engages valve 32. This diameter is so proportioned with respect to the pressure that the tension of spring 26 is sufficient to hold valve 32 closed against the pressure of fluid in cylinder 14 during the initial stages of the outward movement of the brake shoes.

When the brake shoes begin to press against the brake drums, the pressure in cylinder 14 will rise. After the pressure in cylinder 14 has risen to a predetermined value, it will be transmitted through orifice 41 and act against the valve or gasket 32 over an area determined by the diameter of valve seat 42 at the right end of bore 41. The diameter of 42 is so calculated that the force exerted therethrough is sufficient to overcome the resistance of spring 26 and move rod 29 to the right, opening valve 32 after the pressure in cylinder 14 has been built up to the said predetermined value. Thereafter pressure fluid from cylinder 14 is transmitted through the orifice 41 past the head 32 through suitable slots in the periphery thereof to act against cup 28 which causes rod 29 to urge valve 27 against valve seat 24 formed in the counterbore. The piston 18 performs the function of sealing valve guide or plug 12 against the escape of fluid and the interior of piston 23 is in effect a cylinder to receive cup 28 for valve 27 acting on piston 23 while valve 32 is held away from the lip or valve seat 42. This enables fluid to flow through the orifice 41 into the interior of piston head 30. This continued flow of fluid will build up a pressure at the right side of large piston 36 by flowing through passage 44 and the slot 44a in the surface of piston 30 until it is equal to that on the left side thereof which renders the large piston 36 inoperative and causes any further force applied by the brake pedal to rod 20 to be transmitted directly to the fluid by means of piston 23 causing high pressures to be developed in cylinder 14. The speed of the transition of force from piston 36 to piston 23 is governed by the speed with which fluid can flow through the orifice 41 and by making the opening very small the flow is thereby restricted and the pressure on the right side of piston 36 builds up so slowly that the transition from high to low pressure takes place gradually and without a feeling of shock to the brake system.

Figure 2 of the drawings shows the position of head 31, pistons 23 and 36 and valves 27, 32, and 39 when a high pressure is being applied to the pressure fluid in the portion of the cylinder to the left of the piston 36 and in the passageway 4.

Under certain conditions it is entirely possible that a sudden and vigorous application of the brake might be made. In this event the brake pedal compels pistons 23 and 36 to move leftward so rapidly that fluid will surge through the orifice 41 and force valve 32 from its seat before piston 36 has completely expanded the brake shoes against the drum. However, this would not necessarily result in the transition of effectiveness from the large piston 36 to the small piston 23 because as long as piston 36 continues to move relatively rapidly to the left there is created behind it a subatmospheric or negative pressure. When this occurs fluid will flow from the supply tank or chamber in casing 1 through slots 14a, then through the bore 17 in valve guide or plug 12 through apertures 25 then into the bore in piston 23, and then past the lip of cup 28 to aid in filling the void created behind piston 36. The small diameter of orifice 41 makes it impossible for fluid to pass therethrough rapidly enough to fill the void behind piston 36 but fluid will flow in the manner just described as long as there is a subatmospheric or negative pressure behind piston 36 to rapidly fill the void. Even though valve 32 should be lifted from seat or lip 42 by the surge of fluid, it will be returned to engagement with the seat by spring 26 as soon as the surge is ended. This will not affect the proper functioning of the device because the fluid which does pass through the restricted orifice 41 is only a small part of the entire fluid that is required to fill the void created behind piston 36 by any rapid forward movement thereof. It is, therefore, apparent that even though rapid movement does take place, the quantity of fluid within cylinder 14 which is in communication with the conduits leading to the brake cylinders is not materially affected by any rapid movement of the piston devices.

Piston 30 is provided with a plurality of slots 30a, only one of which is shown. These slots receive pressure fluid to prevent it from acting on cup 28 and valve 27 and enabling valve 32 to remain in an open position when the brake pedal connected to rod 20 is "kicked" or "teased." When the brake pedal is "kicked" or "teased" and is not held in a depressed position, valve 32 is momentarily unseated and fluid, retarded from passage through passageway 44 by reason of its size as well as location, passes through passageway 42 to the space in the rear of piston 30 and into slots 30a by reason of sub-atmospheric pressure in said space and slots. The pressure fluid admitted to said space is not effective on cup 28 during any momentary actuation of the brake pedal because of the action of spring 26. When the brake pedal remains depressed the valve 27 will, however, seat upon the development of sufficient pressure on the fluid in said space as set forth above.

The point at which the change from the effectiveness of large piston 36 to the effectiveness of small piston 23 takes place is entirely dependent upon how quickly the subatmospheric or negative pressure behind piston 36, as set forth above, can be changed to a positive pressure which is equal to that in cylinder 14. It is apparent that a very rapid application of the brake pedal to piston rod 20 and subsequently to the associated pistons will allow large piston 36 to function for a longer period than it would under slower application of the brake pedal to piston rod 20 for the reason that it takes a far lesser period of time for the fluid to flow from the reservoir past the lip of cup 28 to fill the void created behind piston 36. This delay has a very positive and definite advantage because the unusually great input of power delivered to the compensator or master cylinder by a sudden and rather vigorous brake application is thus transmitted to the wheel cylinders by the low pressure cylinder 36 until the pressure builds up to a point where it is higher than the normal or predetermined transition point. The delay thus encountered tends to absorb the shock accompanying the first contact of the shoes with the brake drum even under an unusually violent application of the brake pedal.

It is essential that pistons 23 and 36 and associated parts be capable of returning to an inoperative position as rapidly as the pedal is returned by its associated spring and also to repeat the cycle of operation described above as rapidly as possible no matter how quickly the brake pedal is released and depressed in the course of operation. If the transition from low to high pressure did not take place on each stroke of the pedal irrespective of the rapidity of the successive strokes, the succeeding strokes would be transmitted by the small piston exclusively. This would not displace a sufficient amount of fluid to move the shoes into contact with the drum and there would not be an application of the brakes as a result thereof.

The particular construction of the master cylinder set forth above makes the previously described failure impossible. Upon release of the brake pedal the small piston 23 is pulled to the right by the action of the spring associated with the brake pedal. The friction of large piston 36 on the walls of the cylinder 14 allows valve 38 to unseat itself from seat 39 such that fluid can flow from right to left through the ducts 43 in piston 36, which allows the entire piston assembly to follow the brake pedal to the right as rapidly as the latter is released independently of the speed with which the fluid returns to cylinder 14 from the wheel cylinders and associated conduit. This action opens the passageway past valve 7 to fill any space that may be created within cylinder 14 at its left-hand end. If, at any point in the return stroke of the pedal, it is again depressed, valve 7 will first be closed and then valve 38 will immediately seat itself upon valve seat 39 and the transmission of pressure will again be by means of the large piston 36 until the brake shoes contact the brake drum and the predetermined pressure is built up such that it brings into play the operation of small piston 23 after the transition of pressure from the large to the small piston has been achieved again.

Assuming that the shoes have been expanded and brought into contact with the drum and the transition has been made from the low pressure to the high pressure, a subsequent partial release of the brake pedal pressure will not necessarily lower the pressure in cylinder 14 below the predetermined transition point when piston 23 becomes ineffective on the fluid within chamber 14 for the reason that the volume of fluid necessary to produce this pressure is developed by cup 28 which cannot escape until the end of the return stroke is reached and as long as the predetermined pressure is maintained by the action of the spring and the friction of the several parts of the brake and the piston cylinder devices there will be no change-over. If the partial release of the brake pedal is so slight that the brake shoes remain in contact with the drums a sudden and violent re-application of the brake pedal might produce a dangerously abrupt action of the brakes if the force should be continued to be transmitted by means of the high ratio piston 23. However, such a re-application causes a sufficient movement of piston 36 to allow the pressure behind it to drop because the fluid is unable to pass through orifice 41 rapidly enough to cause the pressures to be equalized during the course of such rapid movement. When the pressure on cup 28 is thus released, spring 26 seats valve 32 against seat 42 and the low pressure piston 36 comes into action momentarily. This change to low pressure application plus the gradual build-up of the return from low pressure to high pressure cushions the shock sufficiently to avoid an overly abrupt action of the brakes.

In the event the fluid in cylinder 14 and the associated devices is so viscous as to prevent ready flow through orifice 41, it will not cause a brake failure. Force will continue to be applied to the brake cylinder by means of large piston 36 and small piston 23 is simply ineffective during such time when the fluid is unusually viscous. The device, therefore, causes a certainty of brake action at all times.

Having fully described my invention, that which I claim as novel and desire to protect by Letters Patent of the United States is:

1. In a compounding master cylinder, a casing; a cylinder mounted in said casing for limited reciprocable movement; a first piston in said cylinder; means forming an outlet passage for said cylinder; a reservoir in said casing; means comprising valve means associated with said outlet passage and controlled by the reciprocable movement of said cylinder for controlling communication between said reservoir, said cylinder and said outlet passage; means for moving said cylinder to close said valve means when said first piston is moved forwardly; a second piston of smaller cross-sectional area than said first piston, said pistons associated for simultaneous movement at all times; means for moving said pistons; valve means between said first and second pistons to allow a rapid flow of fluid on one side of said first piston to the other side thereof on the return stroke of said second piston; and means comprising valve means carried by said second piston operative upon the development of a predetermined pressure by said first piston for rendering said first piston ineffective to develop pressure and permitting additional pressure to be developed by said second piston on the fluid ahead of said first piston.

2. In a master cylinder construction, a casing having a reservoir therein; a cylinder mounted in said casing for limited reciprocable movement; means to form an outlet passage from said cylinder; a first piston in said cylinder; means including valve means associated with said outlet passage and controlled by the reciprocable movement of said cylinder governing communication between said reservoir, said cylinder and the associated outlet passage; means for moving said cylinder forwardly to close the valve means when said first piston is moved forwardly; a second piston of smaller cross-sectional area than said first piston; a second valve in said smaller piston seating on said larger piston allowing fluid to rapidly flow from the rear to the forward side of said first piston when it is being retracted; means for connecting the pistons together for simultaneous movement at all times; means for moving said pistons; and means comprising a third valve means carried by said second piston operative upon the development of a predetermined pressure by the first piston for rendering said first piston ineffective to develop pressure and permitting additional pressure to be developed by said second piston in the pressure fluid ahead of said first piston, the pressure fluid acting on said second piston passing through a restricted orifice in said second piston controlled by said third valve to control said valve means in order to effect a gradual transition from low to high pressure in said cylinder.

3. In a pressure fluid transmission system including a device for supplying fluid under pressure and a fluid reservoir; a fluid pressure producing means including a reciprocable cylinder and a reciprocable first piston therein, said cylinder having an outlet port in communication with said fluid reservoir, said outlet port for the cylinder port being normally in communication with the fluid reservoir; valve means controlled by the reciprocable movement of the cylinder to control communication between said cylinder and said reservoir, said cylinder moving when the piston moves forwardly, said piston and cylinder moving relatively to each other after said valve means is closed; a second piston; means including valve means carried by said second piston engageable with said first piston upon forward movement of said pistons to prevent communication from one side of said first piston and openable upon retraction to allow rapid reverse movement of said fluid from one side of said first piston to the other; means in said second piston to prevent the sudden transition of pressure from said first piston to said second piston, said second piston continuing application of pressure on the fluid ahead of said first piston after said first piston becomes inoperative; and means for causing said last mentioned means to become inoperative when the pistons are retracted.

4. In a pressure fluid producing system comprising a casing having a fluid reservoir therein, a pressure fluid producing device comprising a reciprocable cylinder in said casing and having a reciprocable piston therein, said cylinder having a fluid outlet port in communication with said reservoir and said cylinder; valve means in said port controlled by the reciprocable movement of said cylinder; means functioning when said piston moves forwardly for moving said cylinder forwardly to close said valve means and thereby prevent the flow of fluid to said reservoir, said means permitting relative movement to said cylinder after said valve is closed; means comprising a second valve means for automatically rendering said piston inoperative upon the creation of a predetermined pressure in the cylinder portion ahead of said piston and for placing the portion of said piston at the rear of said piston in communication with said outlet; means for continuing to apply pressure to the fluid after said piston becomes inoperative comprising a second piston having a smaller effective cross-sectional area than the first mentioned piston, said second piston developing a higher pressure in the fluid ahead of said first piston, said first mentioned valve means opened when said first piston is retracted; and a third valve means arranged between said pistons enabling a rapid reverse flow of fluid from the rear of said first mentioned piston to the forward side thereof when said pistons are retracted.

5. In a fluid pressure producing apparatus, a reservoir; a cylinder having a rear wall and mounted for limited reciprocable movement; an outlet for said cylinder; valve means controlled by the reciprocable movement of said cylinder for controlling communication between said reservoir and said cylinder; means for developing a low pressure comprising a piston reciprocable in said cylinder; means for closing said valve by movement of said cylinder when said piston therein is moved forwardly; other valve means operable upon the development of a predetermined pressure ahead of said piston for placing the chamber at the rear of said piston in communication with the portion of said cylinder ahead of said piston; means comprising a plunger at the rear of said first named piston for developing a high pressure in the fluid ahead of said piston when said last named valve means is open, said plunger being smaller than said cylinder and extending through the rear wall thereof; packing means for the plunger carried by the rear wall of said cylinder; means for moving said piston and plunger simultaneously in a pressure producing direction; and valve means between said pistons enabling a rapid reverse flow of fluid from the chamber ahead of said first mentioned piston to the chamber at the rear thereof when said pistons are retracted.

6. In a master cylinder, a casing; a cylinder in said casing; a reservoir in said casing; means to support said cylinder in said casing which includes a supporting element arranged in the wall of said casing and having a passageway therethrough connectable with said cylinder; a first valve in said passageway closable by the relative movement of said cylinder with respect to said casing to prevent communication between said cylinder and said reservoir; a second means to support the other end of said cylinder for relative movement; a piston in said second means; a second valve within said piston in said second means to allow fluid from said reservoir to flow to said cylinder; resilient means to hold said second valve in open position; a third valve in the piston in said second means operatively associated with said second valve controlling a passageway in said piston in said second means; a piston in said cylinder, said piston in said second means operatively associated with said piston in said cylinder; a fourth valve on said piston in said second means seatable on said piston in said cylinder; means to reciprocate said pistons, said third valve openable upon the development of a predetermined pressure in said cylinder to simultaneously close said second valve to allow pressure fluid to flow from the side of said piston in said cylinder to the other side thereof, said pressure fluid in said cylinder passing through a restricted orifice in said piston in said second means controlled by said third valve to effect a gradual opening of said third valve when the pressure thereagainst exceeds the tension of the spring holding said second valve open, said third valve after opening enabling said piston in said second means to continue forward movement to develop a higher fluid pressure than said piston in said cylinder develops, said restricted orifice preventing a rapid change from low to high pressure upon the movement of said reciprocating means; and said fourth valve opening upon retraction of said pistons to enable fluid to rapidly reversely flow from one side of said piston in said cylinder to the other.

7. In a pressure fluid producing apparatus, a cylinder having a rear wall; an outlet for said cylinder; a piston reciprocable in said cylinder; a plunger operatively associated with said piston for simultaneous movement therewith and extending rearwardly thereof through the rear wall of said cylinder, said plunger being of smaller diameter than said piston and cylinder; packing means for said plunger so positioned at the rear end of said cylinder to permit said plunger to have relative movement with respect thereto; means comprising a valve for rendering said piston inoperative upon the creation of a predetermined pressure in said cylinder ahead of said piston and for placing the portion of said cylinder at the rear of said piston in communication with said outlet; means for reciprocating said piston and plunger, said plunger producing a high pressure in the fluid ahead of said piston; valve means for permitting fluid to flow to the space at the rear of said piston when said piston is developing pressure; means for closing said last named valve means by movement of said valve element to its open position; and valve means openable upon retraction of said pistons enabling fluid to rapidly flow from the rear of said piston to the forward side thereof.

8. In a pressure producing apparatus, a reservoir; a cylinder reciprocable therein; an outlet for said cylinder; valve means controlled by the reciprocation of said cylinder for controlling communication between said reservoir and both said outlet and said cylinder, said valve means when closed permitting said cylinder to be in communication only with said outlet; a piston in said cylinder; a chamber forward and at the rear of said piston in said cylinder; a second piston of smaller diameter than said first piston operatively associated with said first piston and capable of applying pressure to the fluid in the chamber forward of said piston; means for placing the chamber at the rear of said piston in communication with the chamber forward of said piston; valve means for said means adapted to be opened when the pressure in the cylinder ahead of said piston reaches a predetermined value; means for reciprocating the pistons; means for moving said cylinder forwardly with the pistons to thereby close the first named valve means when said pistons are initially moved from their inoperative positions; and valve means between said pistons enabling a rapid reverse flow of fluid from the chamber at the rear of said piston to the chamber at the forward side thereof when said pistons are retracted.

9. In a pressure fluid producing apparatus, a reservoir; a cylinder reciprocable therein; an outlet for said cylinder; valve means controlled by the reciprocation of said cylinder for controlling communication between said reservoir, said outlet and said cylinder, said valve means when closed permitting said cylinder to be in communication with said outlet only; a piston in said cylinder; a chamber forward of and at the rear of said piston; a second piston at the rear of said first piston operatively associated therewith to apply pressure to the fluid in the chamber ahead of said first piston, said pistons being of different diameters; a passageway through said second piston for placing the cylinder ahead of said first piston in communication with the chamber at the rear thereof; valve means for controlling said passageway; means for reciprocating said pistons; means for moving said cylinder forwardly with the pistons to thereby close said first named valve means when said pistons are initially moved from their inoperative positions; means comprising valve means carried by said second piston for permitting fluid to flow from said reservoir into the chamber at the rear of said first piston during the time such first piston is effective to develop pressure; and valve means between said pistons to enable the flow of fluid from the chamber at the rear of said first piston to the forward chamber when said pistons are retracted.

STEVE SCHNELL.

REFERENCES CITED

The following references are of record in the file of this patent:

UNITED STATES PATENTS

| Number | Name | Date |
|---|---|---|
| 2,298,848 | Swift | Oct. 13, 1942 |
| 2,328,683 | Schnell | Sept. 7, 1943 |

FOREIGN PATENTS

| Number | Country | Date |
|---|---|---|
| 424,676 | Great Britain | Feb. 26, 1935 |
| 114,585 | Australia | Jan. 22, 1942 |